United States Patent [19]

Velazquez Garcia

[11] Patent Number: 5,017,320

[45] Date of Patent: May 21, 1991

[54] PROCESS FOR THE MANUFACUTURE OF STRATIFIED PIECES SUCH AS ROOF TILES AND WALL TILES

[75] Inventor: Rafael Velazquez Garcia, Torrejon de Ardoz, Spain

[73] Assignee: Uralita, S.A., Madrid, Spain

[21] Appl. No.: 864,796

[22] Filed: May 19, 1986

Related U.S. Application Data

[63] Continuation-in-part of Ser. No. 759,056, Jul. 25, 1985, abandoned.

[30] Foreign Application Priority Data

Nov. 20, 1984 [ES] Spain ..................................... 282.723
Dec. 6, 1984 [ES] Spain ..................................... 538.325

[51] Int. Cl.5 ......................... B28B 1/16; B28B 11/12; B28B 11/14; B29C 47/06

[52] U.S. Cl. ..................................... 264/148; 264/149; 264/151; 264/157; 264/160; 264/256; 264/DIG. 31

[58] Field of Search ............... 264/157, DIG. 31, 145, 264/151, 255, 256, 241, 148, 149, 160

[56] References Cited

U.S. PATENT DOCUMENTS

| | | | |
|---|---|---|---|
| 348,443 | 8/1886 | Anderson | 52/612 |
| 461,890 | 10/1891 | Richardson | 52/612 |
| 1,134,741 | 4/1915 | Hill | 52/98 |
| 1,559,499 | 10/1925 | Brandell | 264/133 |
| 1,619,489 | 3/1927 | Schwarz et al. | 264/256 |
| 1,794,572 | 3/1931 | Wyatt | 52/612 |
| 1,967,919 | 7/1934 | Young | 52/612 |
| 2,601,532 | 6/1952 | Knighton | 52/612 X |
| 2,644,217 | 7/1953 | Agar | 264/148 |
| 2,677,955 | 5/1954 | Constaninesco | 52/659 |
| 2,734,249 | 2/1956 | Willis | 198/483.1 |
| 2,962,786 | 12/1960 | Hawk et al. | 425/131.1 |
| 3,235,439 | 2/1966 | Schultheiss | 52/309.1 |
| 3,771,932 | 11/1973 | Dial | 425/296 |
| 4,031,684 | 6/1977 | Shibatu | 52/612 |
| 4,242,406 | 12/1980 | Bouhnini et al. | 52/309.14 |
| 4,666,648 | 5/1987 | Britian | 425/220 X |
| 4,678,418 | 7/1987 | Thulin | 425/310 X |

FOREIGN PATENT DOCUMENTS

| | | | |
|---|---|---|---|
| 2447759 | 4/1975 | Fed. Rep. of Germany | 52/659 |
| 1577321 | 10/1980 | United Kingdom | 264/145 |

*Primary Examiner*—Jan H. Silbaugh
*Assistant Examiner*—Karen D. Kutach
*Attorney, Agent, or Firm*—Ladas & Parry

[57] ABSTRACT

A process for manufacturing stratified pieces, such as roof tiles and wall tiles, by sucessive and independent extrusion of mortars or concretes. In the process mortar is deposited on a limited part of the molds. The mortar is extruded and compacted, and some mortar is dislodged from cross strips in each zone of contact between two consecutive molds. Thereafter, complete sheets of mortar are shaped on the first layers, filling both the emptied cross strips and the limited sides, and lastly the thicknesses of the pieces are cut in their entirety in a vertical transversal plane at each zone of contact of the molds to form multiple layer tiles having homogeneous facing surfaces.

3 Claims, 4 Drawing Sheets

Figures 1A, 1B, 1C, 1D:
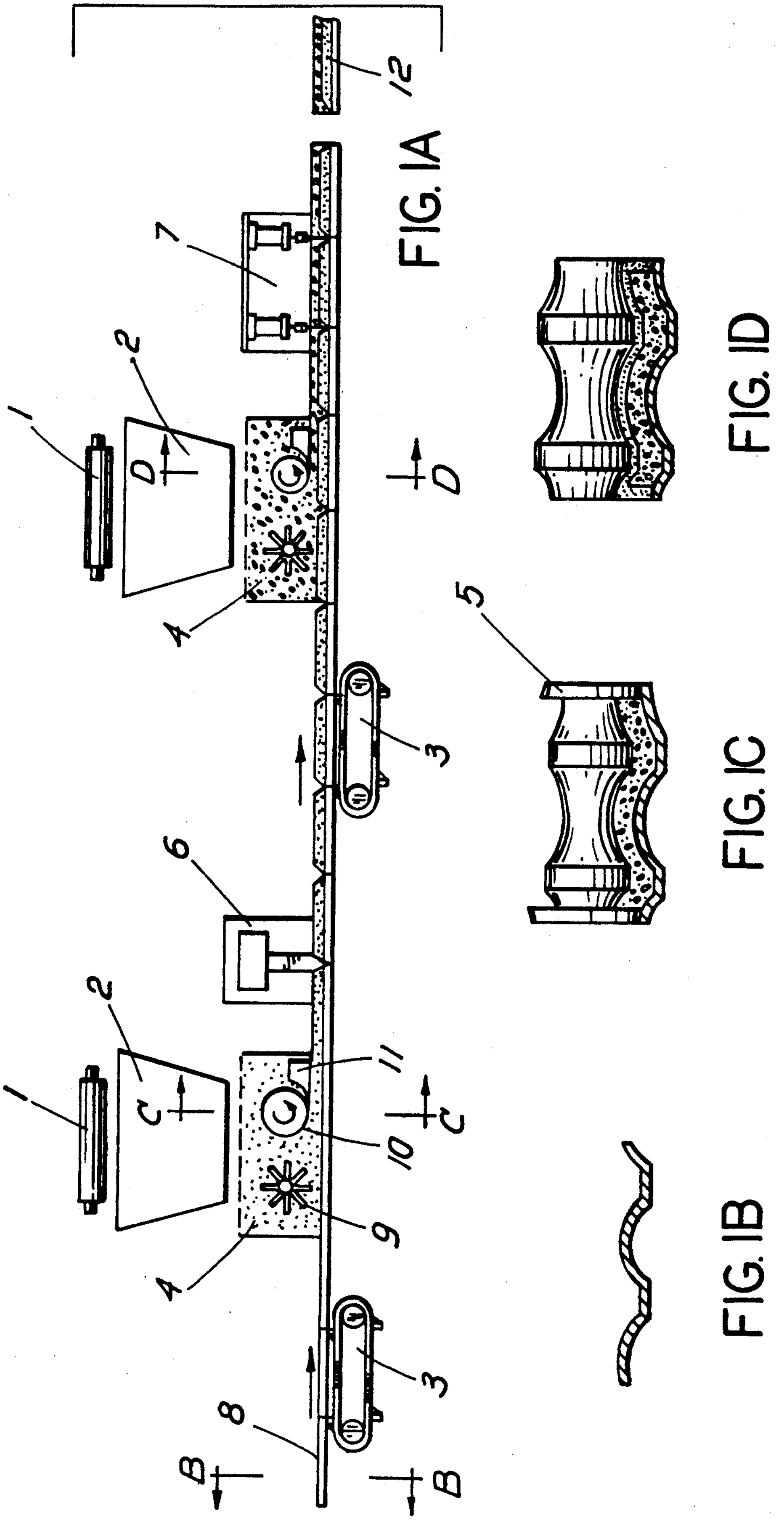

1
2
3
4
5
6
7
8
9
10
11
12
B
C
D

PROCESS FOR THE MANUFACUTURE OF STRATIFIED PIECES SUCH AS ROOF TILES AND WALL TILES

This is a continuation-in-part application of patent application Ser. No. 759,056, filed July 25, 1985 now abandoned.

The present invention refers to a manufacturing process which, by means of extrusion molding, allows members to be obtained comprised by two different superimposed layers of mortars of different compositions and characteristics; the invention likewise refers to an installation for carrying out the mentioned process, as well as to a concrete tile manufactured in accordance with this method.

From H. G. Young's U.S. Pat. No. 1,967,919 of July 24, 1934 a building unit is already known, which comprises a body which consists of a major stratum which constitutes the larger portion of the unit and which is composed of a relatively coarse cementitious material, and by a minor stratum extending over one entire face of the major stratum and substantially one half way down on two opposite sides of said unit.

From U.S. Pat. Ser. No. 4,031,684, issued to Shibata, a board is known planned to be used, among other possible applications, as floor tile, and in whose production natural sources are utilized which had not thus far been used. Such concrete board comprises at least one surface layer and one core layer.

From U.S. Pat. Ser. No. 2,601,532, issued to J. A. Knighton, a method is known for manufacturing concrete blocks, which in essence consists of placing a quantity of facing material, in plastic condition, on a metallic pan, the vibrating of the pan and of the contents for sufficient time to cause the larger size of the aggregate thereof to move out from the bottom of the pan, allowing the material to stand in the pan until it has partially set and, thereafter, putting the material of the block of the member into contact with the surface of the material in the pan, allowing the facing block, thus formed, to settle with the pan and thereafter withdrawing said pan.

By means of the process object of the invention, each of said mortar layers is applied in a complete extruder head, with individual feeding and shaping elements, such that the assembly in series of the heads allows continuous successive molding of the different stratas and obtaining a compact non-exfoliated member, with advantageous behaviour respecting the members constituted by homogeneous or externally coated masses by means of surface treatments.

Hereinafter the process object of the invention will be described which, for purposes of simplification, is directed to the manufacture of laminated members of two layers although, of course, laminated members of three or more layers can be manufactured, for this purpose simply incorporating a series of more molding heads.

The process object of the invention is characterized by the following steps:

Depositing mortar on the molds:

Stirring and pushing the mortar, extruding and compacting it;

Laterally limiting the filling of the molds on the first stage, so that on the second stage the top layer will be uniform all over its surface.

Dislodging the mortar from a narrow transversal strip in the zone of contact of two consecutive molds;

Shaping a complete sheet of mortar over the first layer, in turn filling the emptied transversal zone and the limited sides in the preceding stage;

Cutting in its totality the thickness of the member in a vertical transversal plane coincident with the zone of contact of the molds.

The operation of deposit can be carried out as many times as one desires the laminated member to have layers.

According to an additional characteristic of the process of the invention, the compacting step is carried out after each deposit step, the degree of compacting being variable and depending on the mortar deposited during the preceding deposit step.

Likewise, in accord with the invention the successive steps are performed in continuous fashion, the different molds advancing at constant speed.

Another object of the present invention is constituted by an installation to carry out the process described earlier. Such installation consists of the following elements:

A molding bench having a series of molding heads which, in the present case, for simplification, are considered as two in number;

Each one of the heads being composed of a mortar conveyor-belt, a mortar feeding-dispensing hopper, a molding head with all the rotating and fixed feeding and extrusion elements, a lower mold pushing train and longitudinal side limiters;

A bevelling or chamfering mechanism inserted between the heads and which is provided with cutting blades and devices for evacuation and return of the mortar; and A cutting mechanism installed after the last head.

Still another object of the present invention is constituted by laminated members which, in the present case, are in particular directed to concrete tiles which, in accordance with the invention, show an homogeneous external aspect and which have been manufactured in accord with the process carried out in an installation just as described above.

The installation and concrete tile of this invention will be described in more detail below, with the aid of the attached drawings wherein a preferred, but not exclusive, form of embodiment of the present invention has been represented. These show:

FIG. 1, an installation for manufacturing laminated members, cross-sections of said members in different stages of the said installation likewise being represented.

Figure 2:
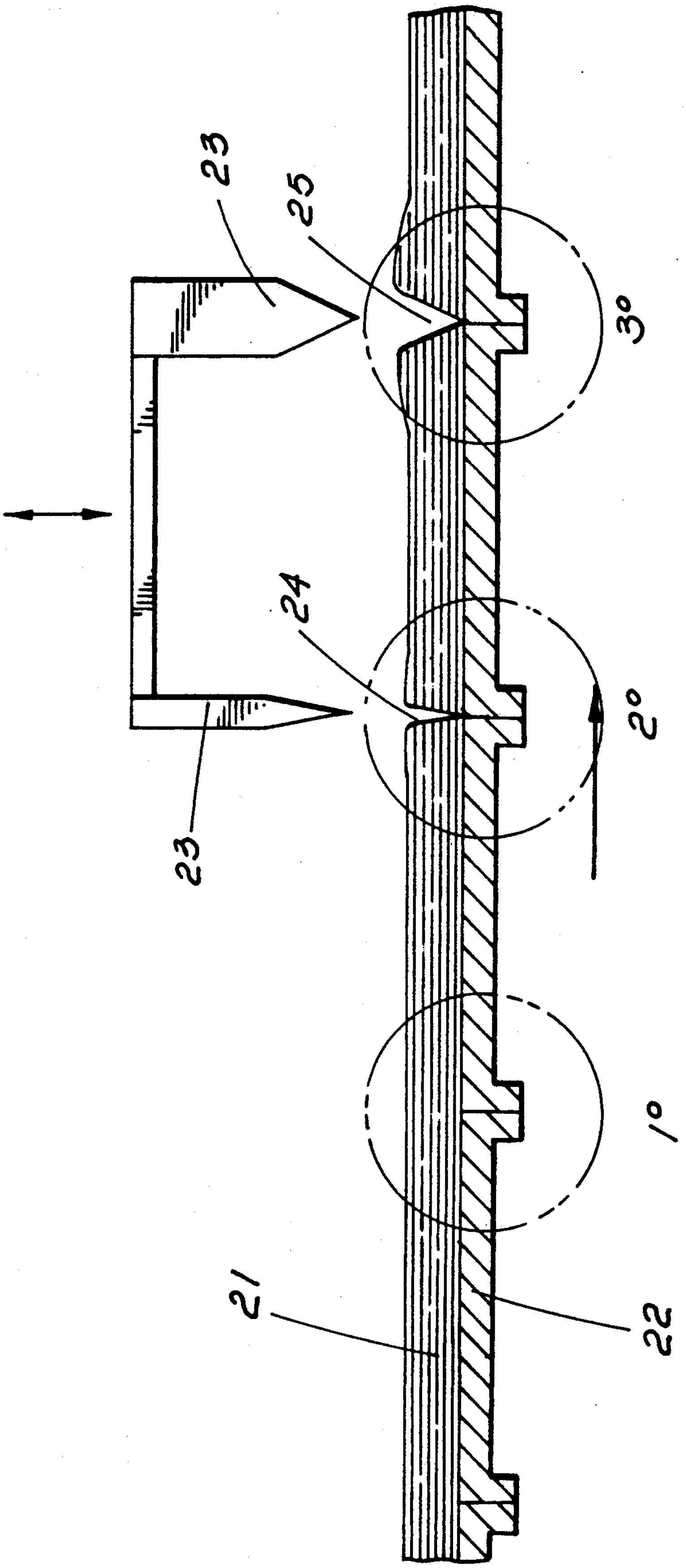
Figure 3:
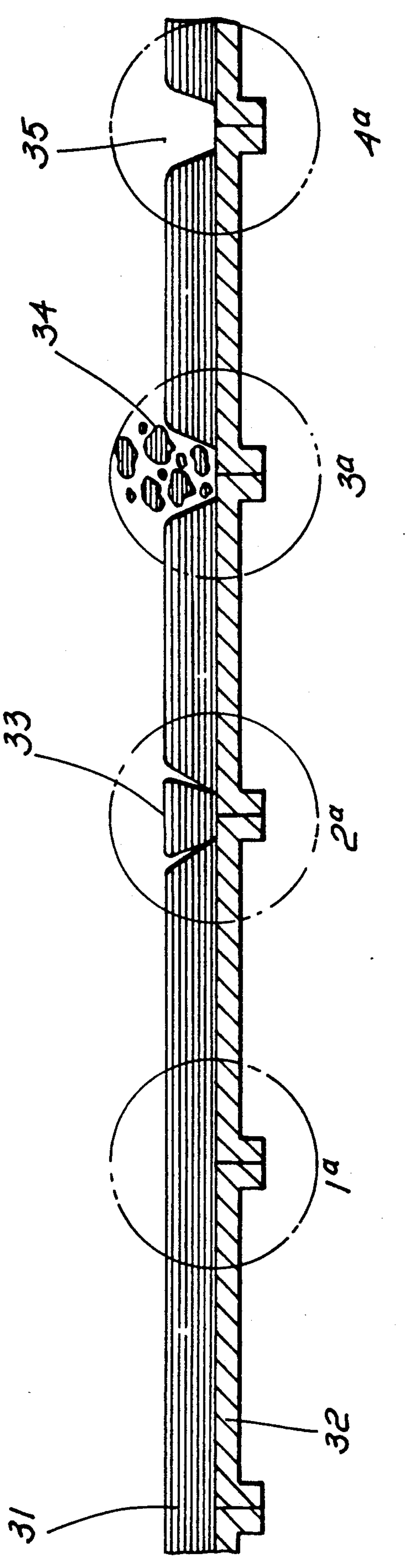
Figures 4A, 4B:
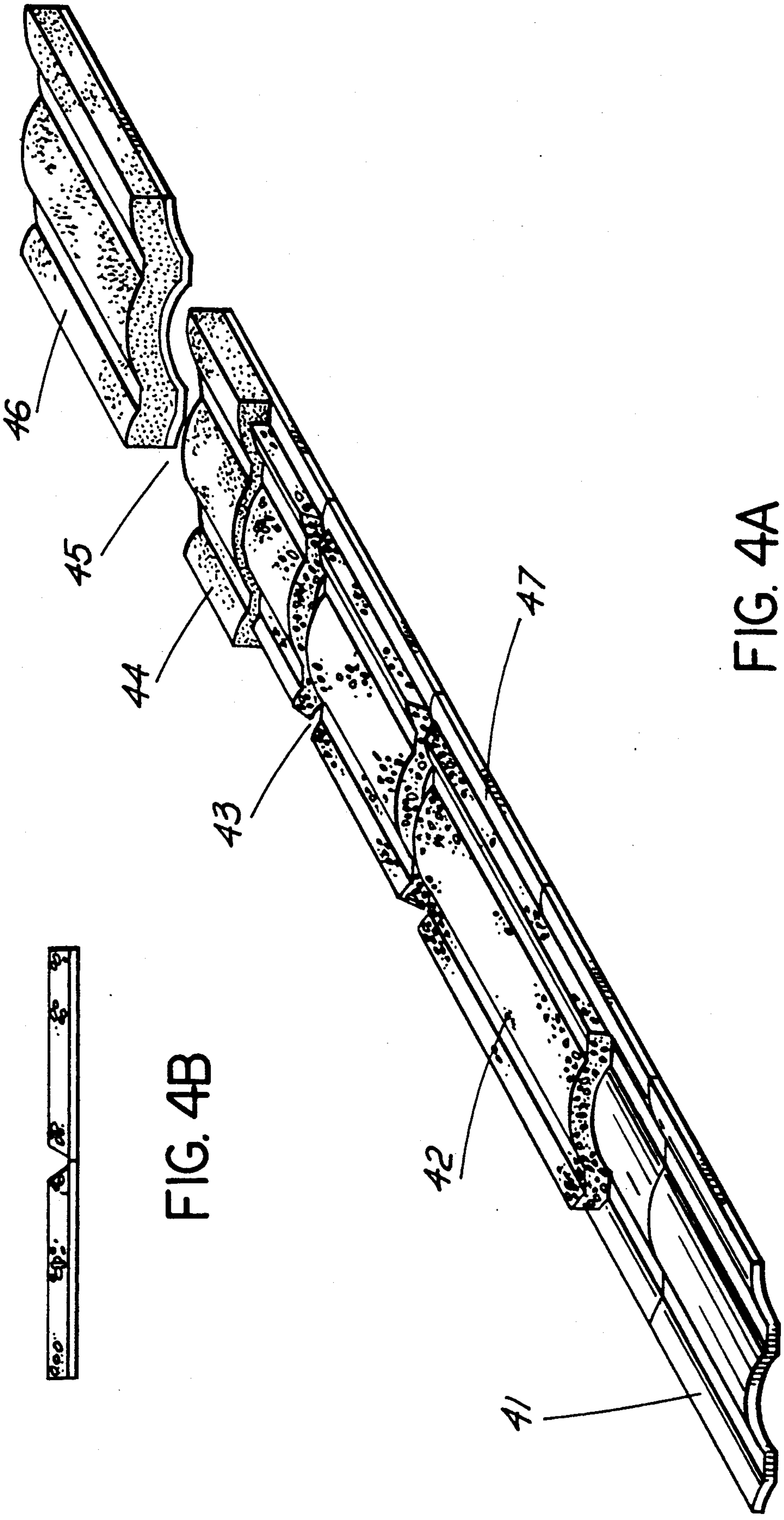

FIG. 2, a cross-section of the bevelling operation with the aid of a bevelling mechanism;

FIG. 3, a sectional view of another alternative bevelling operation with a second type of bevelling device and FIG. 4, a perspective view of the different stages through which the laminated members of the invention pass.

With reference to FIG. 1, an industrial installation is represented for carrying out the process of manufacturing the laminated members of the invention and wherein only those specific new mechanisms of this invention are indicated, the remainder, with suitable adaptations, being able to be the customary ones in suitable industrial installations for obtaining concrete tiles.

In this FIG. 1, just for simplification, only two molding heads are represented, each of which is provided with a mortar conveyor-belt (1), a mortar feeding-dispensing hopper (2), and a molding head (4). As can be seen, said head is provided with all the rotating and fixed feeding and extrusion elements. At the lower part of a conveyor (8) of the molds there is a pushing train (3) for continuous pushing of the molds toward the head and some longitudinal lateral limiters (FIG. 1, element 5, section B-B). A bevelling mechanism 6 is represented inserted between the two heads, which mechanism is provided with cutting blades and devices for evacuation and return of the mortar. As can be seen from FIG. 1, after the last molding head there is a cutting mechanism (7) which has the task of finally separating the different laminated members from the corresponding molds.

The molds reach, via the corresponding conveyor (8), the pushing train (3) of the first head which pushes them in a continuous fashion toward the molding head (4) by means of horizontal pressure applied at the lower part. The molds lean one against the other at their heads and remain inseparable until the cutting in (7) has occurred.

The mortar stored in the dispensing hopper (2), placed over the molding head (4) is stirred and pushed by a feeding shaft (9) and extruded by a mobile revolving roller and by a fixed shaping shoe (11) against the molds which appear over the bench and which move at constant speed. Said molds issue from the molding chamber covered by a first compact continuous layer of mortar with the previously established thickness, except at the side margins, which are unfilled because of the longitudinal feeding limiters which are provided on both sides of the hopper.

At the exit of the first head there is a bevelling mechanism (6), a fundamental part of the installation of the invention, which dislodges the mortar from a narrow transversal strip at the zone of contact of two consecutive molds, to enable the last molding head to fill the hollow with the mortar of the last layer, which allows obtaining a facing surface composed of homogeneous material.

The bevelling mechanism offers two different alternatives, which will be explained in detail upon referring to FIGS. 2 and 3.

By means of the bevel, a transversal trough-like hollow ensues, of adjustable size, in the careful execution of which damage to the adjoining zones has been avoided, which are to be found entire and compact awaiting the final action of the second molding head.

In this molding head, whose operation is similar to that of the first head described above, no longitudinal feeding limiters are provided. A complete sheet of mortar is shaped, whose width coincides with that of the mold, at the same time as it fills the transversal zone emptied by the beveller (FIG. 1, C-C). The mortar applied at this last stage of the molding is formulated in order to obtain an ideal surface finish and, in the particular case of the concrete tiles a special pigment and higher dosage is utilized so that the impermeability properties and appearance of the members obtained notably increases.

It is to be indicated that the existence of a pushing train (3) is important in front of each one of the molding heads, since this allows the use of normal molds customarily used in processes for manufacturing concrete tiles, avoiding the costly supplementary investments which would otherwise be needed in the event of attempting the described effect with a single pushing train. In the case of using just one pushing train, the enormous resistance to be overcome in the molding process would force the molds to be changed for other heavier ones, which would mean another and larger investment.

At the stage subsequent to the molding there is the cutting operation, wherein the entire thickness of the member is completely cut through in the vertical transversal plane which coincides with the zone of contact of the molds. The molds separate immediately following the cutting and continue their progress independently.

The preceding and following stages of the process of manufacturing the stratified members of the invention are the known ones for concrete tiles, namely:

a special kneading section which allows continuous simultaneous supply of different kinds of mortar, and which is provided with suitable dosage, feeder and transport elements, a complete transport system which includes suitable raising, pushing, lowering and movement mechanisms so that the laminated members are placed in storage racks wherein they are subjected to the curing process;

demolding equipment which separates the laminated members from the supporting molds, said equipment being provided with the corresponding elements to send them on to the corresponding circuit;

a system of application for surface treatment and trimming edges and sections; and a packing and wrapping installation.

Referring now to FIGS. 2 and 3, which show the two alternatives of the bevelling process which is carried out with the installation and in accordance with the process of the invention. In the first of these, bevelling by double incision and compression is represented. In FIG. 2 a continuous layer of extruded mortar 21 is represented on the different molds 22. When said continuous layer of mortar becomes located underneath a beveller mechanism which, in this case, consists of two blades (23) of different thicknesses, the first of said blades molds a narrow triangular groove (24) and the second one widens said groove (25) at the transversal zone of contact of the molds, separating the mortar by intense compression.

In FIG. 3 the process of bevelling of the continuous layer of extruded mortar by double incision and evacuation is represented. The continuous layer of extruded mortar (31), placed on the different molds (32) comes to be located on a beveller mechanism (not represented) which consists of oblique blades which make a complete narrow double fissure in transversal direction, one at each side of the zone of contact of the molds, as can be seen in (33). Thereafter, the mortar material left over, resulting from the incision performed, is evacuated through an evacuation device which expels or evacuates such material (as can be seen in (34) to an evacuator device which in turn expels said leftover to a recuperator which, by a return circuit, sends it back to the feeding hopper. The result of such bevelling process can be seen at (35) which is a transversal trough shape hollow, of adjustable size, in whose careful execution damage has been avoided to the adjoining sides which are to be found entire and compact awaiting the final action of the second molding head. This hollow is what will be filled by the second head, so achieving that the external appearance of the member, once cut, will be completely homogeneous.

Finally, in FIG. 4 the process is represented of stratification of the manufactured member in conformity with, the process and with the installation objects of the invention. In said figure the mold is represented with the number 41 appearing as 47 the unfilled side hollow, with the number 42 the first layer of concrete deposited on said mold, with the number 43 the bevelling of the first concrete layer, with the number 44 the second layer of concrete and with the number 45 the freshly cut tile, the finished fresh tile being represented by 46.

Due to what is set forth above, it is obvious that the improvements which are obtained applying the process and installation objects of this invention can be summarized in the following points:

obtaining of laminated layers in which each layer is applied by successive, complete and separate extrusion of mortars of different compositions;

homogeneous finishes in all the facing surfaces of the members;

combination of different characteristics in the different layers, whereby the possibilities of the mortars are more effectively taken advantage of on making an ideal application;

the degree of compaction of the members is notably increased, since the successive molding by layers of small thickness, apart from repeating the compression force on the already-molded layers, is applied with a shorter radius of action which multiplies its intensity;

mortar dosing to preferentially attend to localized requests, which allows a saving of raw materials or more advantage being taken thereof;

quality surface finishes by allowing the suitable components to be concentrated in the last layer; and use of molds normally used in the processes of manufacturing concrete tiles.

What is claimed is:

1. Process for the manufacture of stratified pieces such as tiles by successive and independent extrusions of cement mortars, comprising the steps of:

(a) molding a first mortar layer by extrusion of mortar onto a plurality of consecutive contacting molds to produce a shaped layer having a width which is narrower than that of said molds, said width being limited by side limiters thereby leaving the molds uncovered along bands at each side of said first mortar layer;

(b) dislodging said mortar from cross strips at each area of contact between two consecutive molds to provide a separate molding by mortar on each mold;

(c) molding by extrusion a second mortar layer over said separate moldings, without causing deterioration or alteration of said separate moldings, said second layer covering said molds at said bands and said cross strips to produce a layered product having a desired final thickness of said stratified pieces; and (d) cutting said layered product coincident with said area of contact of said molds to provide said stratified pieces with said first molding covered by said second layer on each side of said first molding not in contact with said mold thereby obtaining homogeneous facing surfaces of said second layer on said stratified pieces.

2. Process according to claim 1 wherein said extrusion molding process is repeated as many times as the desired number of layers in said stratified pieces.

3. Process according to claim 1 wherein successive operations are performed continuously at a constant speed.

* * * * *